(12) United States Patent
Xiong et al.

(10) Patent No.: US 7,901,609 B2
(45) Date of Patent: Mar. 8, 2011

(54) PROCESS FOR PRODUCING METAL OXIDE FLAKES

(75) Inventors: Rong Xiong, Dobbs Ferry, NY (US); Patrice Bujard, Courtepin/Fr (CH)

(73) Assignee: BASF SE, Ludwigshafen (DE)

( * ) Notice: Subject to any disclaimer, the term of this patent is extended or adjusted under 35 U.S.C. 154(b) by 491 days.

(21) Appl. No.: 11/732,405

(22) Filed: Apr. 3, 2007

(65) Prior Publication Data

US 2007/0243337 A1    Oct. 18, 2007

Related U.S. Application Data

(60) Provisional application No. 60/791,048, filed on Apr. 11, 2006.

(51) Int. Cl.
*B29C 35/08* (2006.01)
*D01D 5/40* (2006.01)
*B29B 9/00* (2006.01)

(52) U.S. Cl. ............. 264/405; 264/140; 264/7; 427/212; 427/215

(58) Field of Classification Search .............. 264/7, 140, 264/405; 427/212, 215
See application file for complete search history.

(56) References Cited

U.S. PATENT DOCUMENTS

| | | | |
|---|---|---|---|
| 3,087,827 A | 4/1963 | Klenke, Jr. et al. | 106/291 |
| 4,420,612 A * | 12/1983 | Aiba et al. | 536/102 |
| 5,316,695 A * | 5/1994 | Wilkes et al. | 516/111 |
| 5,733,371 A | 3/1998 | Hashio et al. | 117/208 |
| 5,931,996 A * | 8/1999 | Reisser et al. | 106/404 |
| 6,369,147 B1 | 4/2002 | Polonka et al. | 524/413 |
| 6,822,782 B2 * | 11/2004 | Honeyman et al. | 359/296 |
| 2003/0047115 A1 * | 3/2003 | Bauer et al. | 106/415 |
| 2004/0007159 A1 * | 1/2004 | Katsuta | 106/404 |
| 2004/0265507 A1 * | 12/2004 | Xiong et al. | 427/561 |
| 2005/0004317 A1 * | 1/2005 | Auschra et al. | 525/244 |
| 2005/0287090 A1 * | 12/2005 | Bujard | 424/63 |
| 2007/0031322 A1 * | 2/2007 | Edwards et al. | 423/593.1 |

FOREIGN PATENT DOCUMENTS

| | | |
|---|---|---|
| EP | 0240952 | 10/1987 |
| WO | 93/08237 | 4/1993 |
| WO | WO 2004035694 * | 4/2004 |
| WO | 2004/111298 | 12/2004 |
| WO | 2004/113455 | 12/2004 |
| WO | WO-2005/070819 * | 8/2005 |
| WO | 2006/063949 | 6/2006 |

OTHER PUBLICATIONS

A. M. Peiró et al., Thin Solid Films, vol. 411, May 2002, pp. 185-191.
E. Vigil et al., Thin Solid Films, vol. 365, (2000), pp. 12-18.
E. Vigil et al., Journal of Materials Science Letters, vol. 18, (1999), pp. 1067-1069.
E. Vigil et al., Langmuir, vol. 17, (2001), pp. 891-896.
E. Lerner et al., Journal of Materials Science: Materials in Medicine, vol. 2, (1991), pp. 138-141.
D. Daichuan et al., Materials Research Bulletin, vol. 30, No. 5, pp. 537-541, (1995).
C. Leonelli et al., Microwaves: Theory and Application in Materials Processing V, (2001), pp. 321-327.
I. Girnus et al., Zeolites, vol. 15, pp. 33-39, (1995).
R. Rodríguez-Clemente et al., Journal of Crystal Growth, vol. 169, (1996), pp. 339-346.
D. Daichuan et al., Materials Research Bulletin, vol. 30, No. 5, pp. 531-535, (1995).

* cited by examiner

*Primary Examiner* — Yogendra N Gupta
*Assistant Examiner* — Jeremiah Smith
(74) *Attorney, Agent, or Firm* — Shiela A. Loggins; Joseph Suhadolnik

(57) ABSTRACT

A process for the preparation of a plane-parallel structure (a platelet-shaped body, or flake), comprising at least one dielectric layer consisting of oxides of one or more metal selected from groups 3 to 15 of the periodic table, which method comprises subjecting one or more precursors of one or more desired metal oxides and an acidic catalyst to microwave radiation to form a metal oxide layer on a substrate; and separating the resulting metal oxide layer from the substrate.

14 Claims, No Drawings

PROCESS FOR PRODUCING METAL OXIDE FLAKES

This application claims benefit under 35 USC 119(e) of U.S. provisional application No. 60/791,048, filed Apr. 11, 2006, incorporated herein in its entirety by reference.

The present invention relates to a process for the preparation of a plane-parallel structure (a platelet-shaped body, or flake), comprising at least one dielectric layer consisting of one or more oxides of a metal selected from groups 3 to 15 of the periodic table by subjecting the precursors of the desired metal oxide to microwave radiation to form a metal oxide layer on a substrate and separating the resulting metal oxide layer from the substrate as plane-parallel structures.

BACKGROUND OF THE INVENTION

Methods involving deposition of a metal oxide layer via liquid phase decomposition (hydrolysis) of a corresponding salt (i.e. sulfate or halide) are known per se and have been used to form luster, or pearlescent pigments which have translucent, non-reflective mica core materials. However, such methods, described for example in U.S. Pat. Nos. 3,087,827 and 5,733,371, incorporated herein in their entirety by reference, have not been considered suitable for forming effect pigments with reflective metallic cores in the highly acid (pH of less than 4), aqueous solutions required by such processes. U.S. Pat. No. 6,369,147, incorporated herein in its entirety by reference, discloses a process that solves the foregoing problem by selecting certain metal cores and optionally treating them in such a way that they are rendered more corrosion resistant.

Use of microwave energy for the deposition of metal oxide films onto glass and indium tin oxide coated glass plates used for LED devices is known and disclosed in numerous journal articles such as E. Vigil, L. Saadoun, Thin Solid Films 2000, 365, pp 12-18 and E. Vigil, L. Saadoun, J. Materials Science Letters 1999, 18 pp 1067-1069. Good adhesion was obtained only on indium tin oxide coated glass plates, which the authors suggested was due to some electron donation ability of the indium tin oxide coating (see Vigil, E.; Ayllón, J. A.; Peiró, A. M.; Rodriguez-Clemente, R.; Domènech, X.; Peral, J. Langmuir 2001, 17, 891).

The bulk precipitation of metal oxide particles by microwave irradiation is well known. For examples of bulk precipitation oxides using microwave deposition, see (1) Lerner, E.; Sarig, S.; Azoury, R., Journal of Materials Science: Materials in Medicine 1991, 2, 138 (2) Daichuan, D.; Pinjie, H.; Shushan, D. Materials Research Bulletin, 1995, 30, 537 (3) Leonelli, C. et al., Microwaves: Theory and Applications in Materials Processing 2001, 111, 321, (4) Girnus, I. et al., Zeolites 1995, 15, 33, (5) Rodriguez-Clemente, R. et al., Journal of Crystal Growth 1996, 169, 339 and (6) Daichuan, D.; Pinjie, H.; Shushan, D. Materials Research Bulletin, 1995, 30, 531.

The present invention provides a method whereby precursors of one or more desired metal oxides are converted into a metal oxide layer on a substrate using microwave radiation to generate, after separating the metal oxide layer from the substrate, plane-parallel structures, e.g., flakes, composed of the desired metal oxide or metal oxides. The plane-parallel structures are formed as thin particles, approximately 500 nm thick or less. Flakes can be produced having a smooth mirror-like surface and a high aspect ratio and can be used as substrate material for effect pigments.

Porous structures can also be produced via the present method by incorporating soluble polymers, particularly water soluble polymers, into a composition comprising the metal oxide precursors.

The plane-parallel structures are useful in many applications including interference pigments and effect pigments. The porous structures provide excellent host cites for a variety of materials such as catalysts, colorants, anti-microbial compounds etc.

DESCRIPTION OF THE INVENTION

This invention provides a process for the preparation of a plane-parallel structure (a platelet-shaped body, or flake), comprising at least one dielectric layer consisting of oxides of one or more metals selected from groups 3 to 15 of the periodic table, which process comprises:
(a) optionally applying a layer of release material on a substrate,
(b) applying a composition comprising one or more precursors of one or more desired metal oxides to said release layer, or directly to a substrate with no layer of release material,
(c) subjecting the one or more precursors of one or more desired metal oxides to microwave radiation to form a metal oxide layer on the substrate or on the layer of release material; and
(d) separating the resulting metal oxide layer from the substrate as plane-parallel structures.

The composition comprising one or more precursors of one or more desired metal oxides, also referred to herein as the "precursor composition", may comprise in its entirety precursors of metal oxides but more generally will contain a carrier solvent or dispersion medium such as water and/or an organic solvent and may contain catalysts, fluoride scavengers, surfactants and/or other polymers such as water soluble polymers.

The carrier solvent or dispersion medium used varies with the compounds employed as precursors, but the following solvents are typically used: water, alcohols (e.g. methanol, ethanol), aliphatic or alicyclic hydrocarbons (e.g. hexane, decane, cyclohexane), aromatic hydrocarbons (e.g. toluene, xylene), ketones (e.g. acetone), and mixed systems of these solvents.

The precursor composition may be a coating which is a formulation comprising the one or more precursors of the desired metal oxide(s) which can be applied evenly to a substrate either by immersing the substrate in the coating or by spreading or spraying the coating formulation over the surface of the substrate through standard techniques including drawdowns, brushing, etc. The coating may be dried prior to the precursors being subjected to microwave radiation, or the coating may be left undried. The coating can be applied to the entire surface of the substrate or can be applied to a portion of the substrate, for example, the coating can be applied to one side of a polymer sheet or glass panel or both sides can be coated.

The precursor composition may also be a formulation comprising one or more precursors of the desired metal oxide(s) which formulation is subjected to microwave radiation while the substrate is placed or suspended therein. For example, the substrate may be particles which are suspended in a precursor composition which is a solution or suspension containing one or more precursors of the desired metal oxide(s).

The substrate onto which the metal oxide layer forms can be comprised of almost any organic or inorganic material and can be in almost any solid or semi-solid form including small particles, plaques, sheets etc.

The phrase "precursors of the desired metal oxide" as used herein indicates one or more compounds or metal complexes that under the conditions of the present process are converted into a layer of one or more metal oxides, the metal being selected from groups 3 to 15 of the periodic table. Mixed metal oxide layers can be prepared from precursor compositions wherein the precursors of the desired metal oxide comprise a mixture of precursors containing different metals.

The forming of the metal oxide layer can be conveniently carried out between about 15° C. and about 95° C. The temperature can be adjusted by tuning the power output of the microwave magnetron or maintaining a constant power output while changing the time intervals of power on and off.

A catalyst or fluorine scavenger is used in converting the precursors of the desired metal oxide to the metal oxide layer. The catalyst or fluorine scavenger can be present in the precursor composition or if a layer of release material is present, the release material can comprise the catalyst or fluorine scavenger. In some instances, the substrate itself can serve as catalyst or fluorine scavenger. Catalysts or fluorine scavengers may also be present in both the precursor composition and the release material.

In one embodiment, the catalyst or fluorine scavenger is part of the precursor composition and no layer of release material is used. In one particular embodiment, an acid catalyst is part of a coating comprising the precursor composition no layer of release material is used.

In another embodiment a layer of release material, also referred to as a release layer is applied to a substrate prior to applying the precursor composition and the release material acts as catalyst or fluorine scavenger during the formation of the plane-parallel structures.

Examples of catalysts are acidic compounds, such as polystyrenesulfonic acid, polyvinylsulfonic acid and strong mineral acids. For example, the catalyst is a polystyrenesulfonic acid, polyvinyl sulfonic acid, co-polymer of polystyrenesulfonic acid or co-polymer of polyvinyl sulfonic acid; for example, the catalyst is poly(4-styrenesulfonic acid). In certain embodiments, a basic catalyst can be used such as a polyvinylamine or polyvinylpyridine. More than one catalyst may be used.

Examples of fluorine scavengers include boric acid, alkali metal borates, ammonium borate, boron anhydride or boron monoxide. Both fluorine scavengers and catalysts can be present during the method of the instant invention.

The single layer flakes obtained by the present method are characterized by a particle size from about 1 to 100 microns and a thickness from about 10 to about 500 nm.

The process of the present invention allows for the production of very thin particles, for example approximately 10-500 nm thick, for example approximately 80-300 nm thick. In many instances flakes are prepared with thicknesses less than 150 nm for example approximately 120 nm.

As the precursor composition can be applied in an even or uniform layer, e.g., as a coating, the process of the present invention also allows for production of particles with consistent thickness. For example, metal oxide flakes can be prepared wherein the thickness of at least 90% of the flakes is from about 90 to about 200 nm, for example the thickness of at least 90% of the flakes is from about 90 to about 150 nm.

One embodiment of the present invention comprises:
applying to a substrate a coating layer comprising one or more metal oxide precursors and an acid catalyst;

subjecting the coating layer to microwave radiation to form a metal oxide layer on said substrate, and
separating the resulting metal oxide layer from the substrate as plane-parallel structures.

For example, a coating comprising a metal acid ester and an acid catalyst is applied to a flat substrate via drawdown techniques, the coated substrate is treated with microwave radiation to form the metal oxide layer and the metal oxide layer is removed as plane-parallel structures.

For example, the acid catalyst is a polystyrenesulfonic or polyvinylsulfonic acid. For example the coating comprises a carrier solvent or dispersion medium of water or water and an organic solvent. The metal oxide layer is removed, for example, by washing the microwaved treated coated substrate with water or water and an organic solvent.

For example, the precursor of a desired metal oxide is represented by the general formula:

$$MX_nO_m,$$

wherein M is a metallic element of selected from groups 3 to 15 of the periodic table; X is one or more members selected from the group consisting of alkyl, alkoxy, acyloxy, hydroxy and halogen atoms; O is oxygen and n and m are each an integer wherein n+2m is the valence of the metallic element, its polymers and solutions thereof.

The metallic element is a divalent or multi-valent metal, for example a metal selected from Groups IIIa, IVa, IVb and Va of the periodic table, for example one or more members selected from the group consisting of boron, aluminum, silicon, titanium, zirconium and tin.

Of the organic group of the metallic compounds used in the present invention, the alkyl group includes methyl, ethyl, butyl, pentyl, lauryl, etc.; the alkoxy group includes methoxy, ethoxy, propoxy, butoxy, pentoxy, etc.; and the acyloxy group includes acetoxy, propionyloxy, butyryloxy, etc. The alkyl group may also be substituted with other groups including amino, amino salt, hydroxy, alkoxy, and carboxy acid, acid salt, ester and amide. For example the alkyl group can be an amino ethyl, amino propyl, dialkyl amino propyl, or carboxy substituted propyl group.

Another embodiment of the present invention comprises the process:
applying a layer of release material on a substrate, wherein the release material is a basic or acidic catalyst,
applying a coating comprising one or more metal acid esters which are the precursors of the desired metal oxide coating on said release layer;
subjecting said coating to microwave radiation to form the metal oxide layer from the precursors on said substrate, and
separating the resulting metal oxide layer from the substrate as plane-parallel structures.

For example, the release material comprises an acidic catalyst, for example, a polystyrenesulfonic acid or polyvinylsulfonic acid.

For example, the coating comprises one or more metal acid esters as precursors of the desired metal oxide and a surfactant.

For example, the desired metal oxide again is represented by the formula: $MX_nO_m$, wherein M, X, O, n and m are as described above.

For example, a solution of the catalyst comprising polystyrenesulfonic acid is coated on a flexible belt, such as a continuous flexible belt or sheet. A mixture comprising water, a metal acid ester, such as, tetraethylorthosilicate, and optionally a surfactant, is then applied and the substrate is treated by microwave radiation. In this example, acid hydrolysis of tetraethylorthosilicate occurs and water is not only a solvent but also a reactant.

In another embodiment of the present invention, water soluble polymers are included in the precursor composition to provide porous flakes comprising the metal oxides. For example, a coating comprising one or more metal acid esters as in the above and also comprising a water soluble polymer is applied onto a substrate or onto a layer of release material which has been applied onto a substrate, the coating is subjected to microwave radiation and the resulting metal oxide layer is separated by washing with water to leave a porous metal oxide flake.

Examples of precursor compounds useful in the above processes include
trialkoxyaluminums such as trimethoxyaluminum, triethoxyaluminum, triisopropoxyaluminum, tributoxyaluminum, tripentoxyaluminum, etc.;
halogenated aluminums such as aluminum trichloride, aluminum tribromide, etc.;
alkylalkoxysilanes such as monomethyltrimethoxysilane, monobutyltrimethoxysilane monomethyltriethoxysilane, monoethyltripentoxysilane, diethyidimethoxysilane, diisopropyldiethoxysilane, tributylmonomethoxysilane, etc.;
tetraalkoxysilanes such as tetramethoxysilane, tetraethoxysilane, tetraisopropoxysilane, tetrabutoxysilane, etc.;
tetraacyloxysilanes such as tetraacetoxysilane, tetrapropionyloxysilane, tetrabutyryloxysilane, tetrapentanoyloxysilane, etc.;
tetraalkoxytitaniums such as tetramethoxytitanium, tetraethoxytitanium, tetraisopropoxytitanium, tetrabutoxytitanium, tetrapentoxytitanium, etc.;
halogenated alkoxytitaniums such as monochlorotrimethoxytitanium, monochlorotributoxytitanium, monobromotrimethoxytitanium, dichlorodibutoxytitanium, diiododiethoxytitanium, trichloromonomethoxytitanium, trichloromonopentoxytitanium, tribromomonomethoxytitanium, etc.;
halogenated titaniums such as titanium tetrachloride, titanium tetrabromide, titanium trichloride, etc.;
tetraalkoxyzirconiums such as tetramethoxyzirconium, tetraethoxyzirconium, tetraisopropoxyzirconium, tetrabutoxyzirconium, tetrapentoxyzirconium, etc.;
halogenated zirconiums such as zirconium tetrachloride, zirconium tetrabromide, zirconium oxydichloride, etc.;
tetraacyloxyzirconiums such as tetraacetoxyzirconium, tetrapropionyloxyzirconium, tetrabutyryloxyzirconium, tetrapentanoyloxyzirconium, etc.;
tetraalkyltins such as tetramethyltin, tetraethyltin, tetraisopropyltin, tetrabutyltin, tetrapentyltin, etc.;
halogenated tins such as stannic chloride, stannic bromide, stannous chloride, etc.;
diacyloxyzincs such as diacetoxyzinc, dipropionyloxyzinc, dibutyryloxyzinc, dipentanoyloxyzinc, etc.;
halogenated zincs such as zinc chloride, zinc bromide, etc.; and mixtures of these compounds.

Suitable metal acid esters include alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate. Acetylacetonates and acetoacetylacetonates of the afore-mentioned metals may be used, for example, zirconium acetylacetonate, aluminium acetylacetonate, titanium acetylacetonate and diisobutyloleyl acetoacetylaluminate or diisopropylolyl acetoacetylacetonate and mixtures of metal acid esters, for example Dynasil® (Hüls), a mixed aluminium/silicon metal acid ester.

Other examples of precursor compounds are obvious in light of this disclosure.

The present invention also provides a process which comprises;
(a) applying a layer of release material on a substrate, wherein the release material comprises an acid catalyst and/or a fluorine scavenger;
(b) applying a coating comprising one or more fluorine containing metal complexes as the precursors of the desired metal oxide on said release layer to form a precursor layer;
(c) subjecting said precursor layer to microwave radiation to form a metal oxide layer on said substrate, and
(d) separating the resulting metal oxide layer from the substrate as plane-parallel structures.

In said embodiment the substrate is a flexible belt, especially a continuous flexible belt; or a sheet. Optionally, the flexible belt is further coated with a thin film of at least one electrically conductive material. The at least one electrically conductive material is either a metal or a transparent electrically conductive metal oxide. In case that the electrically conductive material is a metal, said metal is preferably copper or aluminium. Preferred electrically conductive metal oxides are tin or titanium oxide dotted with halogen atoms. Suitable aqueous precursor solutions for the preparation of the electrically conductive metal oxide layer are known and described in, for example, Vigil et al., Thin Solid Films 2000, 365, 12 and Vigil et al., J. Langmuir 2001, 17, 891. The conductivity of the electrically conductive layer is preferably between $10^{-2}$ to 100 ohm per square, more preferably between 1 to 10 ohm per square. Due to the improved heating properties of the electrically conductive material, film growth is more easily activated by microwave radiation heating.

It is possible to use polyester foils having a rectangular grating with 2-3 micron wide ridges, where the distance between the ridges is 30 microns and the grating depth is 150-170 nm.

There is no particular limitation to a method for coating the release material and the metal oxide precursor layer onto the substrate and regulating the thickness of the coating film to form a thin film, and the conventionally well-known coating methods and apparatus are used. For example, there are methods such as spray coating, brushing etc. In addition to this, there is a method of dipping a surface in the base liquid put in a container.

For the substrate, those having a shape suitable for continuous production such as rolls, belts, sheets, films, etc. are particularly useful. For belts, polymeric materials are used. For sheet and film, polymeric materials, particularly polyesters, polyamides, polyimides, polypropylene, etc. are used.

The fluorine scavenger is any compound that can scavenge fluorine ions in aqueous solution such as boric acid, an alkali metal borate such as sodium borate, ammonium borate, boron anhydride or boron monoxide, particularly preferably ammonium borate. In one embodiment of the invention, ammonium borate is used. The concentration of the ammonium borate solution is at least that which is required to scavenge fluoride ion during the deposition of the metal oxide coating on substrate. In one embodiment an excess of the ammonium borate is used.

The release material is a fluorine scavenger which is preferably chosen from boric acid, an alkali metal borate, such as sodium borate, ammonium borate, boron anhydride and boron monoxide, and the precursor of the desired metal oxide is a fluorine containing metal complex which is chosen from ammonium hexafluorotitanate; ammonium hexaflurostanate; ammonium hexafluorosilicate; iron(III) chloride, hydrofluoric acid and ammonium fluoride mixtures; aluminum(III) chloride, hydrofluoric acid and ammonium fluoride mixtures; ammonium hexafluorogermanate; indium(III) fluoride, hydrofluoric acid and ammonium fluoride mixtures; and combinations of indium(III) fluoride trihydrate and ammonium hexafluorostanate.

The oxides of elements of the groups 3 to 15 of the periodic table, especially $TiO_2$, $ZrO_2$, $CoO$, $SiO_2$, $SnO_2$, $GeO_2$, $ZnO$, $Al_2O_3$, $V_2O_5$, $Fe_2O_3$, $Sb_2O_3$, $Cr_2O_3$, $PbTiO_3$ or $CuO$, or a mixture thereof, are deposited on the flexible belt by applying a solution of a fluorine containing metal complex which is a precursor of the desired metal oxide and applying microwave energy. The precursor solution that forms the desired metal oxide is preferably an aqueous solution of one or a combination of the following materials:
(a) a soluble metal fluoride salt,
(b) a soluble metal fluorine complex, or
(c) any mixture that forms said salt or complex.

Examples include ammonium hexafluorotitanate; a complex prepared from ammonium fluoride and titanium chloride or titanium chloride, ammonium fluoride and hydrogen fluoride; ammonium hexafluorostanate; ammonium hexafluorosilicate; ammonium pentafluorosilicate; iron(III) chloride, hydrofluoric acid and ammonium fluoride mixtures; aluminum(III) chloride, hydrofluoric acid and ammonium fluoride mixtures; ammonium hexafluorogermanate; and a combination of indium(III) fluoride trihydrate and ammonium hexafluorostanate. In the last example it forms metal oxide films comprising more than one element-indium/tin oxide films.

The concentration of the fluorine containing metal complex is not critical and is dictated by what is easy to handle. Thus, the concentration may range from about 0.01 M up to a saturated solution.

The metal oxide is advantageously titanium dioxide and the fluorine containing metal complex is selected from ammonium hexafluorotitanate, a complex prepared from ammonium fluoride and titanium chloride or titanium chloride, ammonium fluoride and hydrogen fluoride, or the metal oxide is iron oxide and the fluorine containing metal complex is selected from the group iron(III) chloride, hydrofluoric acid and ammonium fluoride mixtures; or the metal oxide is silicon dioxide and the fluorine containing metal complex is ammonium hexafluorosilicate or ammonium pentafluorosilicate.

The solution of the fluorine scavenger and then metal oxide precursor are sequentially applied to the belt or sheet and thereafter treated with microwave radiation.

In a particular embodiment of the present invention the fluorine containing metal complex is ammonium hexafluorotitanate, an ammonium fluorosilicate salt, or iron(III) chloride/ammonium fluoride, wherein after separation from the substrate plan-parallel structures of $TiO_2$, $SiO_2$, or $Fe_2O_3$ are produced.

To produce a mixed interference/absorption effect via any of the embodiments described herein, the metal oxide layer of dielectric material is typically a colored (selectively absorbing, not gray or black) oxide or colored mixed oxides of elements of groups 5 to 12, for example the metal oxide layer comprises $Fe_2O_3$.

A colored metal oxide layer and/or colored metal oxide flakes can be produced, when the deposition of the metal oxide is carried out in the presence of a colorant, especially an organic pigment, or carbon black. Suitable organic pigments are, for example, described in W. Herbst and K. Hunger, VCH Verlagsgesellschaft mbH, Weinheim/New York, 2nd, completely revised edition, 1995 and are, for example, selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, perylene, diketopyrrolopyrrole, quinacridone, phthalocyanine, indanthrone or iminoisoindolinone pigment, or a mixture or solid solution thereof.

Notable pigments useful in the present invention are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

The metal oxide layer of the dielectric material can also be modified by incorporating therein a luminescent material.

The term "luminescence" means the emission of light in the visible, UV- and IR-range after input of energy. The luminescent material can be a fluorescent material, a phosphorescent material, an electroluminescent material, a chemoluminescent material, a triboluminescent material, or other like materials. Such luminescent materials exhibit a characteristic emission of electromagnetic energy in response to an energy source generally without any substantial rise in temperature.

The luminescent compound can be an organic luminescent compound, or composition, i.e. a luminescent colorant, wherein the term colorant comprises dyes as well as pigments, or an inorganic phosphor.

Examples of fluorescent colorants useful in the present invention are those based on known colorants selected from coumarins, benzocoumarins, xanthenes, benzo[a]xanthenes, benzo[b]xanthenes, benzo[c]xanthenes, phenoxazines, benzo[a]phenoxazines, benzo[b]phenoxazines and benzo[c]phenoxazines, napthalimides, naphtholactams, azlactones, methines, oxazines and thiazines, diketopyrrolopyrroles, perylenes, quinacridones, benzoxanthenes, thio-epindolines, lactamimides, diphenylmaleimides, acetoacetamides, imidazothiazines, benzanthrones, perylenmonoimides, perylenes, phthalimides, benzotriazoles, pyrimidines, pyrazines, and triazines. In one embodiment of the present invention the luminescent colorant is the condensation product of

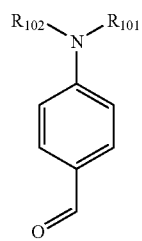 and 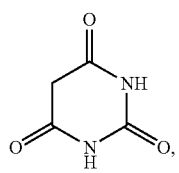

wherein $R_{101}$ and $R_{102}$ are independently hydrogen or $C_1$-$C_{18}$ alkyl, such as for example, methyl, ethyl, n-propyl, isopropyl, n-butyl, sec-butyl, isobutyl, tert-butyl, n-amyl, tert-amyl, hexyl, heptyl, octyl, 2-ethylhexyl, nonyl, decyl, dodecyl, tetradecyl, hexadecyl or octadecyl. For example, $R_{101}$ and $R_{102}$ are methyl. The condensation product is of formula

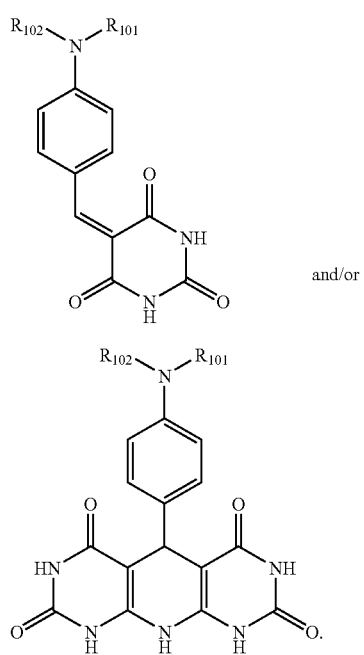

The organic luminescent compound can also be an optical brightener, for example, selected from distyrylbenzenes, distyrylbiphenyls, divinylstilbenes, triazinylaminostilbenes, stilbenyl-2h-triazoles, benzoxazoles, furans, benzo[b]furans, and benzimidazoles, 1,3-diphenyl-2-pyrazolines, coumarins, naphthalimides, and 1,3,5-triazin-2-yl derivatives.

The inorganic phosphor is, for example, selected from sulfides and selenides, such as zinc and cadmium sulfides and sufoselenides, alkaline-earth sulfides and sulfoselenides, and oxysulfides, oxygen-dominant phosphors, such as borates, aluminates, silicates, halophosphates and phosphates, germanates, oxides, arsenates, vanadates, sulfates, and tungstates and molybdates, and halide phosphors, especially $Zn_{1-x}Cd_xS$ ($0 \leq x \leq 0.3$), optionally comprising activators, such as copper and silver, manganese, gold, rare earths, and zinc; MgS, or CaS, activated with rare earths, such as europium, cerium, or samarium; $Y_2O_2S:Eu^{3+}$, $Y_2O_2S:Tb^{3+}$, $Gd_2O_2S:Tb^{3+}$, $Sr_3B_{12}O_{20}F_2:Eu^{2+}$, $Y_3Al_5O_{12}:Ce^{3+}$, $Ce_{0.65}Tb_{0.35}MgAl_{11}O_{19}$, $BaMg_2Al_{16}O_{27}:Eu^{2+}$, $Y_2Al_3Ga_2O_{12}:Tb^{3+}$, $ZnSiO_4:Mn$, $Y_2SiO_5:Ce^{3+}$, $3\ Ca_3(PO_4)_2 \cdot Ca(F, Cl)_2:Sb^{3+}$, $Mn^{2+}$, $(Sr,Mg)_3(PO_4)_2:Sn^{2+}$; $LaPO_4:Ce^{3+}$, $Tb^{3+}$; $Zn_3(PO_4)_2:Mn^{2+}$; $Cd_5Cl(PO_4)_2:Mn^{2+}$; $Sr_3(PO_4)_2.SrCl_2:Eu^{2+}$; and $Ba_2P_2O_7:Ti^{4+}$, $3\ Sr_3(PO_4)_2.SrCl_2:Eu^{2+}$, $Y_2O_3:Eu^{3+}$, $Y_2O_3:Eu^{3+}$, $Tb^{3+}$, $ZnO:Zn$, $6\ MgO.As_2O_5:Mn^{4+}$, $YVO_4:Eu^{3+}$, alkali-metal and alkaline-earth sulfates activated with $Ce^{3+}$ and optionally manganese; $MgWO_4$, $CaWO_4$, alkali-metal halides, optionally comprising Tl, Ga, or In, such as LiI/Eu, NaI/Tl, CsI/Tl, CsI/Na, LiF/Mg, LiF/Mg, Ti and LiF/Mg, Na; $CaF_2:Mn$; $CaF_2:Dy$, $(Zn, Mg)F_2:Mn^{2+}$, $KMg\ F_3:Mn^{2+}$, $MgF_2:Mn^{2+}$, $(Zn, Mg)F_2:Mn^{2+}$, $LaOCl:Tb^{3+}$, $LaOBr:Tb^{3+}$ and $LaOBr:Ce^3$.

Another embodiment of the present invention comprises:
b) applying a composition comprising one or more precursors of desired metal oxides onto boron nitride (BN) flakes;
c) subjecting the one or more precursors of desired metal oxides to microwave radiation to form a layer comprising desired metal oxides onto the boron nitride flakes, and
d) separating the resulting metal oxide layer from the substrate as plane-parallel structures.

The boron nitride substrate flakes have boric acid on their surface, which function as a fluorine scavenger. By using, for example, hexafluorosilicate and boron nitride flakes (boric acid) as substrate, $SiO_2$ flakes can be obtained.

In a particular embodiment, boron nitride flakes are suspended in the compostion comprising one or more precursors of desired metal oxides and the resulting suspension is subjected to microwave radiation.

Instead of boron nitride substrate flakes, flakes having a surrounding coating which acts as catalyst during the formation of the plan-parallel structures can be used as substrate.

Examples of such substrate flakes are glass flakes, mineral flakes, such as mica, graphite, $BIOCl$, $Al_2O_3$, and $SiO_2$ flakes; ceramic flakes, such as $TiB_2$, $BN$, $SIC$, $B_4C$ and $Si_3N_4$ flakes, and inert metal flakes.

The surrounding coating, which acts as catalyst, fluoride scavenger and/or release layer during the formation of the plan-parallel structures, can be applied, for example, by microencapsulation.

In principal all known microencapsulation techniques may be used, which lead to outer polymeric shell containing the flakes in the inner core.

Typical techniques for forming a polymer shell are described, for instance, in GB 1,275,712, 1,475,229 and 1,507,739, DE 3,545,803 and U.S. Pat. No. 3,591,090. Generally these processes employ a continuous aqueous phase into which the shell forming materials are dissolved.

In particular, microencapsulation processes suitable in the instant invention fall into three categories a) coacervation method, b) interfacial polymerization method and c) in-situ polymerization method. These methods can ideally accomplish the polymeric shell around the flakes. The microencapsulation processes form discrete microcapsules of a size comparable to that of the flakes enclosed. The flakes are microencapsulated in a shell of continuous polymeric material, which does not form a covalent or ionic bond with the flakes surface, and maintains them separated from the substrate.

The coacervation method utilizes the formation of an oil-in-water emulsion. The polymeric shell material is coacervated out of the aqueous medium and the polymer colloid deposited as capsule shell around the dispersed oily droplets through careful control of concentration, pH and temperature to form the microcapsules. Materials suitable for coacervation include gelatin and gum acacia as described in U.S.2800457. WO9220441 describes encapsulated particles comprising a core surrounded by a coacervate coating that comprises a low critical solution temperature (LCST) polymer and a water removal depressant for the temperature of reversible insolubilisation of that polymer. The composition is made by forming a dispersion of the water insoluble core particles in a solution of the polymer, heating the solution to cause it to precipitate as a coacervate, and then adding the depressant. In this process the LCST wall building material coacervates from the exterior. To prevent the encapsulated particles of the invention coagulating and subsequently phase separating in the environment in which they are to be used, an entropic stabilizing polymer, such as carboxymethyl cellulose, sodium alginates or starch, can be mixed with the LCST polymeric component prior to encapsulation.

The interfacial polymerization method depends on the reaction of two interfacial polymerisable monomers at the interface of an oil-in-water emulsion. Generally an oil soluble first monomer is dissolved in the disperse phase and a second water-soluble monomer is added to the aqueous phase. The monomers react by polycondensation reaction at the interface between the dispersed oily droplets and surrounding aqueous medium and forming a polymeric membrane around the oil droplets. Polymeric membranes formed are polyurea and polyurethane's as described in U.S. Pat. No. 3,429,827 and U.S. Pat. No. 4,428,978.

Processes of forming capsules involving in-situ polymerisation of amino resins are known. Generally aminoplast capsules are formed by distributing a water immiscible liquid in an aqueous liquid containing the aminoplast precursor, for instance a melamine formaldehyde resin. The capsule wall is formed by in-situ polymerisation of the amino resin prepolymer onto the droplets of water immiscible liquid. Thus the capsule wall is built up from the exterior by polycondensation of the prepolymer from the aqueous continuous phase. In situ polymerization is a well-known method and its principal features are already described in GB 1 507 739.

Typically the wall thickness of the shell is from about 20 nm to about 2000 nm, for example, from about 100 nm to about 1000 nm.

For example the weight ratio of microcapsule-forming material to microencapsulated flake is from about 0.001:1 to about 1:1. In many cases, 0.01:1 to about 0.5:1 is a good choice.

The process of the present invention can also be used to produce multilayer pigments.

Accordingly, another embodiment of the present invention further comprises:
(b1) applying a composition comprising one or more precursors of a desired metal oxide to a metal oxide layer formed in steps (b) and (c); and
(c1) subjecting the precursors to microwave radiation to form a layer comprising a desired metal oxide onto the already formed metal oxide layer, wherein the metal oxide layer formed in step (c1) is different from the metal oxide formed in step (c).

The process enables the production of multiplayer planparallel structures having alternating layers of metal oxides, such as, for example, A/A'/A, or A/A'/A/A'/A/A'/A, wherein A, for example, $TiO_2$, is the metal oxide layer obtained in step (c) and A', for example $SiO_2$, is the metal oxide layer obtained in step (c1); or B/B'/B/B'/B, wherein B, for example $SiO_2$, is the metal oxide layer obtained in step (c) and B', for example $TiO_2$, is the metal oxide layer obtained in step (c1).

EXAMPLES

The following non-limiting examples help illustrate the present invention.

Example 1

Silicon Oxide Flakes 3 grams of Tetraethyl orthosilicate, 0.03 grams of Tomadol® (non-ionic surfactant) and 3 grams of a 1% poly(4-styrenesulfonic acid) solution in water are mixed in a sonicator to form a clear solution. 12 grams of water is added to dilute the mixture. This solution is coated on a 12×12" polyester sheet with a No 2.5 drawdown rod (wet thickness: ~10 microns). The polyester sheet is placed in a microwave oven and treated with microwave radiation for 2 minutes and then rinsed with water to wash off the silicon oxide flakes. The flakes are collected in a beaker and dried. After drying the approximately 120 nm flakes become more colored as the refractive index of air differs from that of the water which surrounded the wet flakes.

Example 2

Zirconium Oxide Flakes

A solution of zirconium tetrabutoxide in n-hexane is applied to a polyester film, which has been coated with polystyrenesulfonic acid. The film is then passed through a dryer in which the film is exposed to a stream of a 120° C. nitrogen gas to remove more than 90% of the n-hexane to form a zirconium tetraburoxide film. The thus coated polyester film is passed through a chamber in a conditioned state of 80% in relative humidity and treated with microwave to effect hydrolysis and condensation of zirconium tetrabutoxide, placed in a vessel containing water and treated by ultrasound to separate the flakes from the film. The stripped flakes are then recovered from water by means of a filter and calcinated at about 750° C. to obtain flaky zirconia.

Example 3

Titanium Oxide Flakes

The process of Example 2 is repeated using instead of a solution of zirconium tetraburoxide a solution of titanium tetramethoxide in methanol.

Example 4

Aluminum Oxide Flakes

The process of Example 2 is repeated using tributoxyaluminum instead of zirconium tetraburoxide.

Example 5

Aluminum Oxide Flakes

The process of Example 4 is repeated using monoacetoxydibutoxyaluminum instead of tributoxyaluminum instead of zirconium tetraburoxide.

Example 6

Tin Oxide Flakes

The process of Example 2 is repeated using monooctyltributoxytin instead of zirconium tetraburoxide.

Example 7

Porous Silicon Oxide Flakes

The Process of Example 1 is repeated using a solution of 3 grams of Tetraethyl orthosilicate, 0.03 grams of Tomadol® (non-ionic surfactant) and 3 grams of a 1% poly(4-styrenesulfonic acid) solution in water to which 0.1 g of polyethylene glycol is added. Porous silicon oxide flakes are collected.

Example 8

Porous Silicon Oxide Flakes

The process of example 7 is repeated using No. 6 draw down rod (wet thickness ~15 microns) instead of No. 2.5 drawdown rod.

The invention claimed is:

1. A process for the preparation of a plane-parallel structure comprising at least one dielectric layer consisting of oxides of one or more metal selected from groups 3 to 15 of the periodic table, which process comprises: (b) applying a composition comprising one or more precursors of one or more desired metal oxides and an acid catalyst, wherein the precursor of the desired metal oxide is a metal acid ester, directly to a substrate with no layer of release material, (c) subjecting the one or more precursors of one or more desired metal oxides to microwave radiation to form a metal oxide layer on the substrate; and (d) separating the resulting metal oxide layer from the substrate as plane-parallel structures, wherein the acid catalyst is poly(4-styrenesulfonic acid) and the metal acid ester is selected from the group consisting of aryl alcoholates, carboxylates, carboxyl-radical alcoholates, alkyl-radical alcoholates and aryl-radical-substituted alkyl alcoholates of aluminum, boron, silicon, tin and zirconium.

2. A process for the preparation of a plane-parallel structure comprising at least one dielectric layer consisting of oxides of one or more metal selected from groups 3 to 15 of the periodic table, which process comprises: (a) applying a layer of release material on a substrate, (b) applying a composition comprising one or more precursors of one or more desired metal oxides to said release layer, (c) subjecting the one or more precursors of one or more desired metal oxides to microwave radiation to form a metal oxide layer on the layer of release material; and (d) separating the resulting metal oxide layer from the substrate as plane-parallel structures, wherein the release material comprises an acidic catalyst and the precursor of the desired metal oxide is a metal acid ester, wherein the acid catalyst is poly(4-styrenesulfonic acid) and the metal acid ester is selected from the group consisting of aryl alcoholates, carboxylates, carboxyl-radical alcoholates, alkyl-radical alcoholates and aryl-radical-substituted alkyl alcoholates of aluminum, boron, silicon, tin and zirconium.

3. A process according to claim 1, wherein the metal acid ester is an orthosilicate.

4. A process according to claim 1, wherein the composition comprising precursors of the desired metal oxide also contains a polymer soluble in either water or organic solvent to produce porous plane platelet structures.

5. A process according to claim 1, wherein mixtures of metal oxide precursors are used to produce plane platelet structures comprising more than one metal.

6. A process according to claim 1 further comprising:
(b1) applying a composition comprising one or more precursors of a desired metal oxide to a metal oxide layer formed in steps (b) and (c) of claims 1; and
(c1) subjecting the precursors to microwave radiation to form a layer comprising a desired metal oxide onto the already formed metal oxide layer, wherein the metal oxide layer formed in step (c1) is different from the metal oxide formed in step (c).

7. A process according to claim 6, wherein steps (b1) and (c1) are repeated to form multilayer plane-parallel structures having alternating layers of metal oxides.

8. A process according to claim 1 wherein the metal oxide layer is separated from the substrate by washing with water or water and an organic solvent.

9. A process according to claim 2, wherein the metal acid ester is an orthosilicate.

10. A process according to claim 2, wherein the composition comprising precursors of the desired metal oxide also contains a polymer soluble in either water or organic solvent to produce porous plane platelet structures.

11. A process according to claim 2, wherein mixtures of metal oxide precursors are used to produce plane platelet structures comprising more than one metal.

12. A process according to claim 2 further comprising:
(b1) applying a composition comprising one or more precursors of a desired metal oxide to a metal oxide layer formed in steps (b) and (c) of claims 2; and
(c1) subjecting the precursors to microwave radiation to form a layer comprising a desired metal oxide onto the already formed metal oxide layer, wherein the metal oxide layer formed in step (c1) is different from the metal oxide formed in step (c).

13. A process according to claim 12, wherein steps (b1) and (c1) are repeated to form multilayer plane-parallel structures having alternating layers of metal oxides.

14. A process according to claim 2 wherein the metal oxide layer is separated from the substrate by washing with water or water and an organic solvent.

* * * * *